United States Patent Office 2,844,540

Patented July 22, 1958

2,844,540

METHOD OF MAKING AN ELECTROLUMINESCENT PHOSPHOR

Richard M. Rulon, Wenham, and Keith H. Butler, Marblehead, Mass.

No Drawing. Application December 17, 1952
Serial No. 326,586

3 Claims. (Cl. 252—301.6)

This invention relates to electroluminescent phosphors, that is to phosphors which emit light upon the application of an electric field.

The electroluminescent phosphors heretofore used have been generally of the zinc sulfide type. Ordinary manganese activated zinc silicate phosphors, for example, do not show electroluminescence at the usual average field strengths used in the art.

We have found, however, that manganese-activated zinc orthosilicate will give bright electroluminescence under such fields if tin chloride is added to the powdered phosphor under conditions favoring reduction or under neutral conditions followed by heat treatment in a reducing atmosphere. We believe that the addition of tin chloride may form conducting spots on the crystal surface, in the form of a metallic tin or sub-oxides of tin, probably containing a little chloride. The addition of the tin in the manner described changes the color of the phosphor from white to gray, when observed under ordinary white light.

In one embodiment of our invention, manganese-activated zinc orthosilicate, spread in a thin layer on a tray of inert, acid-resistant and heat-resistant material is heated in a furnace held at a temperature between 400° C. to 800° C. until all the phosphor has reached substantially the temperature of the furnace. The tray is then removed from the furnace and the phosphor sprayed for a short time with a solution of stannic chloride dissolved in a mixture of methyl or ethyl alcohol with a water solution of formaldehyde. The exact composition of the solution is not critical, although best results are obtained if a reducing agent such as formaldehyde is present.

In another embodiment of our invention, we wet the phosphor with a solution of the same type, namely a mixture of stannic chloride, alcohol, and formaldehyde solution and mix the resulting paste until substantially uniform. Excess solvents comprising alcohol and water are evaporated in an oven and the dry powder placed in a ceramic tray. The tray is then placed in a tube having smaller inlet and exit tubes attached and the air removed by flushing with the reducing gas. After all the air has been removed, the portion of the tube containing the tray is then heated to a temperature between 550° C. and 825° C. for a time between 10 minutes and 60 minutes. The source of heat is removed and the tube cooled to a temperature below 300° C. before removing the tray. The flow of reducing gas is maintained both during firing and during cooling.

The composition of the mixture used in treatment is not critical but all three components appear to be necessary for good results. We believe that stannic chloride may form a complex addition compound with the alcohol and formaldehyde, and that the treated phosphor is coated with this complex compound, which, when fired in a reducing atmosphere, is converted to a conducting material or coating. We have found that amounts of stannic chloride between ½% and 5% by weight of phosphor are required for production of good electroluminescence, the weight of stannic chloride being taken as the pentahydrate. This corresponds to between ⅙% and 1⅔% of tin by weight.

The ambient atmosphere during firing must also be reducing in nature. We prefer to use mixtures of hydrogen and nitrogen containing from 3 to 20% hydrogen by volume but other reducing gases such as carbon monoxide or illuminating gas are also satisfactory.

The phosphor is definitely changed in appearance by our treatment. The untreated material is pure white in color and shows some fluorescence when exposed to long ultraviolet radiation having a wavelength between 310 and 400 millimicrons. The treated phosphor, in contrast, is definitely grey in color and has a very much weaker response to long ultraviolet radiation.

Phosphors made by the processes of our invention may be used in electroluminescent lamps of the usual types.

In one embodiment of the invention, 100 grams of zinc orthosilicate, activated by manganese and containing trace amounts of lead and arsenic, were heated in a furnace at about 760° C. until the phosphor had come to that temperature. The tray was then removed and the phosphor sprayed while hot with a solution comprising 1 gram of $SnCl_4 \cdot 5H_2O$, 5 cc. of formaldehyde solution (37% HCHO) and 80 cc. of ethyl alcohol (acetone denatured).

In the preferred embodiment of our invention, mixing of the materials is used instead of spraying. For example 100 grams of powdered zinc orthosilicate, activated with 2% manganese, and containing trace amounts of lead and arsenic, were mixed with a solution comprising 1 gram of $SnCl_4 \cdot 5H_2O$
5 cc. of formaldehyde solution (37% HCHO)
80 cc. ethyl alcohol (acetone denatured)

The paste was well mixed and dried for one hour at 150° C. Ten-gram portions of the treated powder were then fired at 1400° F. in a mixture of 3% hydrogen and 97% nitrogen, the firing time being 30 minutes, and the rate of flow of the gas mixture being 300 cc./minute. The tube dimensions were approximately 1½ inches diameter by 30 inches long.

For use as a light source, the resulting phosphor powder was then dispersed in a mixture of resins in solvents, the mixture containing as solids for every 10 grams of the resultant powdered phosphor:

4 grams alkyd resin
4 grams melamine resin
1 gram ethyl cellulose resin
1 gram tri-cresyl phosphate The phosphor may be dispersed in a solution of other materials, as known in the art, but the above combination of resins and phosphate gave a high dielectric constant, high resistivity and good adherence to the glass onto which it was eventually coated.

The resins were dissolved in a mixture of solvents, comprising xylol, toluol, methyl Cellosolve acetate, ethyl acetate, butyl acetate, and alcohol, although other solvents can be used in proportions suitable for spray application, before dispersion of the phosphor therein. For example the following mixture of solvents was used, in the proportions given by volume:

Xylol 50%
Toluol 20%
Ethyl acetate 5%
Butyl acetate 15%
Ethyl alcohol 5%
Methyl Cellosolve acetate 5%

The above combination of solids was particularly advantageous as a spraying vehicle, but other combinations, well-known in the art, can be used.

The phosphor dispersion was sprayed on conducting glass and the resins then cured by heating to 150° C. for 10 minutes. An aluminum film was applied to the back of the phosphor-resin layer and electrodes attached to this film and to the conducting glass, as shown for example in the copending application Serial No. 230,596, filed June 8, 1951, by Lowry, Mager and Butler and now abandoned.

On application of a 60 cycle alternating current of 600 volts a light output of 0.015 footlambert was obtained, the emitted light being green in color.

What we claim is:

1. The method of making an electroluminescent phosphor, which method comprises: mixing manganese-activated zinc silicate, stannic chloride, alcohol and formaldehyde into a substantially uniform paste, the stannic chloride being ½% to 5% of the weight of the mixture, evaporating excess solvents, and heating the resultant dried mixture in a reducing atmosphere.

2. The method of making a manganese-activated zinc silicate phosphor electroluminescent, said method comprising: mixing the manganese-activated zinc silicate phosphor with ½% to 5% by weight of stannic chloride, with about 5 cc. of formaldehyde solution and about 80 cc. of alcohol for each gram of stannic chloride, to form a substantially uniform paste, evaporating excess solvents and heating the resultant dried mixture at between 550° C. and 825° C. in a reducing atmosphere.

3. The method of making a manganese-activated zinc silicate phosphor electroluminescent, said method comprising: mixing zinc silicate containing about 2% manganese with ½% to 5% by weight of stannic chloride, with about 5 cc. of formaldehyde solution and about 80 cc. of alcohol for each gram of stannic chloride, to form a substantially uniform paste, evaporating excess solvents and heating the resultant dried mixture at between 550° C. and 825° C. in a reducing atmosphere.

References Cited in the file of this patent

UNITED STATES PATENTS 2,554,999 Merrill ---------------- May 29, 1951

FOREIGN PATENTS 599,028 Great Britain ---------- Mar. 3, 1948